United States Patent
Mitsubori

[19]

[11] Patent Number: 5,961,246
[45] Date of Patent: Oct. 5, 1999

[54] STRUCTURE FOR JOINING IMPELLER TO ROTATABLE SHAFT

[75] Inventor: Ken Mitsubori, Yokohama, Japan

[73] Assignee: Ishikawajima-Harima Heavy Industries, Ltd., Tokyo, Japan

[21] Appl. No.: 08/821,652

[22] Filed: Mar. 20, 1997

[30] Foreign Application Priority Data

Apr. 3, 1996 [JP] Japan .................................. 8-081153

[51] Int. Cl.$^6$ .............................. F01D 5/26; F16D 11/00
[52] U.S. Cl. .......................... 403/365; 403/375; 403/359
[58] Field of Search ................... 403/359, 365, 403/375

[56] References Cited

U.S. PATENT DOCUMENTS

| | | | |
|---|---|---|---|
| 2,730,387 | 1/1956 | White | 403/359 |
| 3,222,772 | 12/1965 | Leyner | 403/359 X |
| 3,894,621 | 7/1975 | Quick | 403/359 X |
| 4,210,372 | 7/1980 | McGee et al. | 403/359 X |
| 5,163,816 | 11/1992 | Goetzke et al. | 416/204 |

*Primary Examiner*—Chuck Y. Mah
*Assistant Examiner*—Alison K. Pickard
*Attorney, Agent, or Firm*—Griffin, Butler, Whisenhunt & Szipl, LLP

[57] ABSTRACT

There is provided a structure for joining an impeller to a rotatable shaft, including (a) a bushing through which the impeller is joined to the rotatable shaft, the bushing including a hollow cylindrical portion which is to fit into a recess formed with the impeller and into which the rotatable shaft is to fit, (b) a first joint structure for joining the bushing to the impeller so that the bushing is positioned coaxially with the impeller, and (c) a second joint structure for joining the rotatable shaft to the bushing so that the rotatable shaft is positioned coaxially with the bushing. The structure provides a sufficient ability for transferring a torque between an impeller and a shaft, self-aligning performance between an impeller and a shaft, and good serviceability for assembling and disassembling, and further provides higher accuracy in axially positioning an impeller and a shaft and lower fabrication costs.

17 Claims, 4 Drawing Sheets

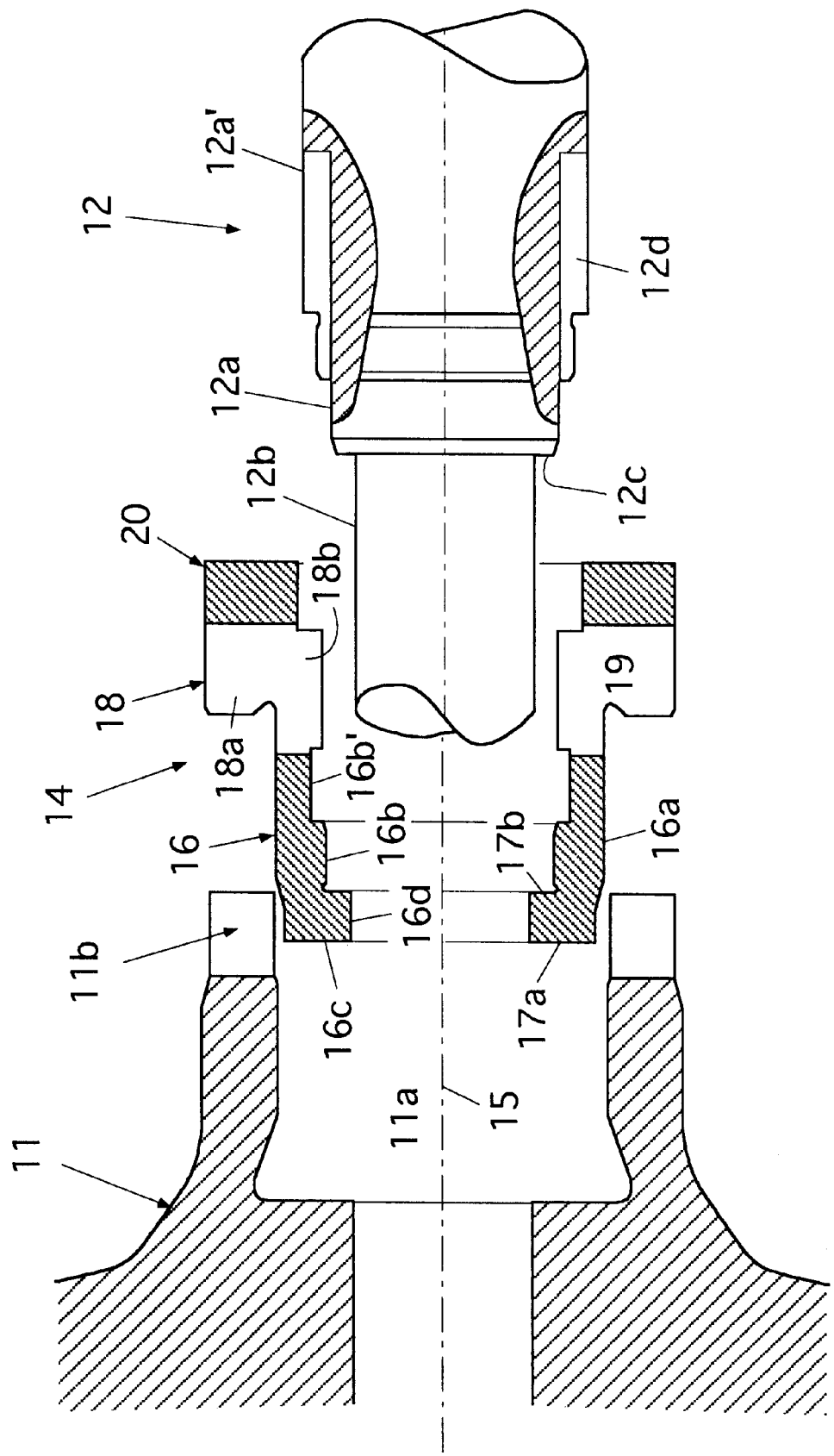

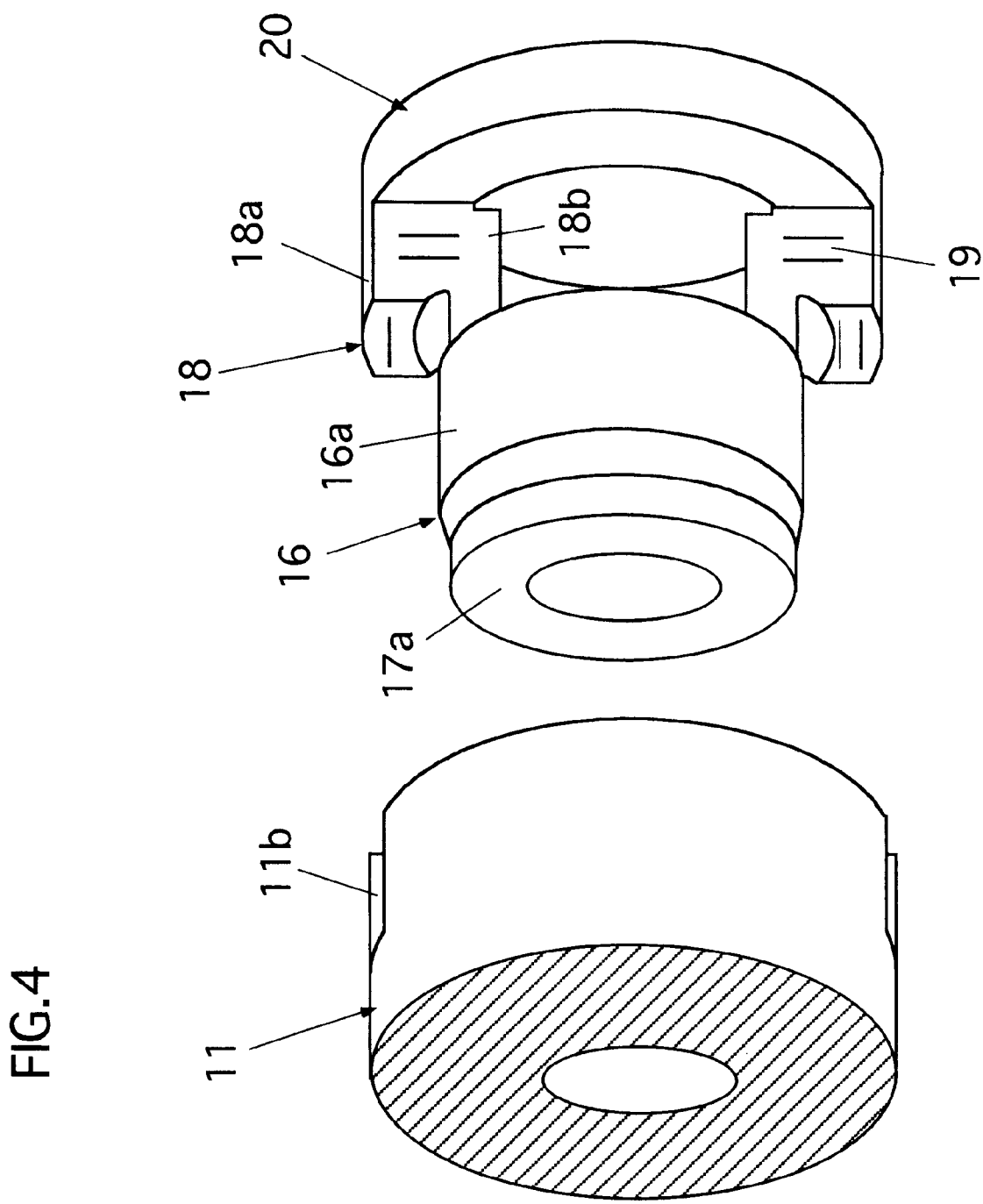

STRUCTURE FOR JOINING IMPELLER TO ROTATABLE SHAFT

BACKGROUND OF THE INVENTION

1. Field of the Invention

The invention relates to a structure for joining an impeller rotatable at a high speed to a rotatable shaft.

2. Description of the Related Art

A structure for joining an impeller rotatable at a high speed to a rotatable shaft to be used, for instance, in a supercharger or a fan is required to have such basic characteristics as an ability for transferring a torque between an impeller and a shaft, a self-align ability for self-aligning an impeller with a shaft, and serviceability. Herein, the ability for transferring a torque between an impeller and a shaft includes an ability for transferring a torque in usual conditions such as steady rotation, acceleration and deceleration, and an ability of avoiding instantaneous elimination of torque transfer ability for preventing over-speeding in unusual conditions such as when an impeller is damaged or when foreign material enters the impeller structure. The self-aligning ability includes an ability that an impeller and a shaft are self-aligned with each other when assembled in a stationary condition to thereby easily keep rotation balance, and an ability of absorbing therein deformation of an impeller and/or a shaft caused by a centrifugal force produced by rotation. Herein, the deformation caused by a centrifugal force includes, for instance, an expansion in the inner diameter and a shrinkage in the axial length of the impeller. The above mentioned serviceability includes an ability of easily assembling and disassembling.

Various attempts have been made to satisfy the above mentioned requirements. Examples of conventional structures for joining an impeller to a shaft are illustrated in FIGS. 1A, 1B and 1C. FIG. 1A illustrates a conventional structure in which an impeller 1 is joined to a shaft 2 by means of shrink fitting. FIG. 1B illustrates another conventional structure in which an impeller 1 is joined to a shaft by means of a combination of a radial key 4, a spline 5, and a nut 6. FIG. 1C illustrates still another conventional structure in which an impeller is joined to a shaft 2 by means of a radial key 4, a tapered bushing 7, and a nut 6.

The structure illustrated in FIG. 1A has problems as follows. Since a torque is transferred through shrink fitting, a capacity of the torque is not so large as the other structures in usual. In addition, if an excessive torque is generated due to foreign material entering the impeller, the shrink fitting is forced into a slippage condition, and hence an ability of transferring a torque is instantaneously eliminated. Furthermore, the shrink fitting makes it quite difficult to assemble the impeller 1 to the shaft 2 and to disassemble the impeller 1 out of the shaft 2.

The structure illustrated in FIG. 1B has a problem of low self-aligning ability in the spline 5. That is, it is necessary that a gap exists between the top and bottom of the spline 5, in order to mesh teeth of the spline 5 with each other to thereby transfer a torque. This reduces self-aligning accuracy in the spline 5. If the spline 5 was formed with a fit section only for self-alignment, there would arise a problem of reduction in the easiness of assembling the spline 5.

In the structure illustrated in FIG. 1C, the tapered bushing 7 disposed between the impeller 1 and the rotatable shaft 2 increases the self-aligning ability of the structure. Hence, it is difficult to accurately position the impeller 1 axially. In order to enhance the positioning accuracy of the impeller 1, parts constituting the structure are required to be fabricated with high accuracy, which would bring a problem of increased fabrication costs.

SUMMARY OF THE INVENTION

In view of the above mentioned problems in the prior structures, it is an object of the present invention to provide a structure for joining an impeller to a shaft which provides a sufficient ability for transferring a torque between an impeller and a shaft, a self-align ability between an impeller and a shaft, and good serviceability for assembling and disassembling, and further provides higher accuracy in axially positioning an impeller and a shaft and lower fabrication costs.

In one aspect, there is provided a structure for joining an impeller to a rotatable shaft, including (a) a bushing through which the impeller is joined to the rotatable shaft, the bushing including a hollow cylindrical portion which is to fit into a recess formed with the impeller and into which the rotatable shaft is to fit, (b) a first joint structure for joining the bushing to the impeller so that the bushing is positioned coaxially with the impeller, and (c) a second joint structure for joining the rotatable shaft to the bushing so that the rotatable shaft is positioned coaxially with the bushing.

It is preferable for the first joint structure to include a projection and a recess into which the projection is fit, one of which is formed with the bushing, and the other is formed with the impeller. For instance, the projection may be formed with the bushing and the recess may be formed with the impeller.

The first joint structure may include a plurality of the projections formed on an outer surface of the hollow cylindrical portion, in which the projections are circumferentially equally spaced away from each other.

The second joint structure may include a projection and a recess into which the projection is fit, one of which is formed with the bushing, and the other is formed with the rotatable shaft. For instance, the projection may be formed with the rotatable shaft and the recess may be formed with the bush.

It is preferable that the bushing further includes an annular ring connected to the second means so that the bushing and the annular ring are coaxial with each other.

In a preferred embodiment, an inner surface of the hollow cylindrical portion is comprised of a plurality of segments having different inner diameters, and the rotatable shaft is comprised of the same number of segments as the number of the segments of the inner surface of the hollow cylindrical portion. Each of the segments of the rotatable shaft has an outer diameter equal to an inner diameter of an associated segment of the inner surface of the hollow cylindrical portion.

There is further provided a structure for joining an impeller to a rotatable shaft through a bushing which includes a hollow cylindrical portion and a plurality of key portions, the hollow cylindrical portion including a sidewall defined by an outer surface and an inner surface coaxial with the outer surface, and an end portion defined by an outer surface perpendicular to an axis of the hollow cylindrical portion and an inner surface parallel to the outer surface, the end portion being centrally formed with a through hole which has a smaller diameter than a diameter of the inner surface of the hollow cylindrical portion and which is coaxial with the inner surface of the hollow cylindrical portion, the key portions circumferentially, integrally formed with the hollow cylindrical portion at an opposite side of the end portion of the hollow cylindrical portion, the key portions being defined by a pair of planes parallel to each other and spaced away from each other circumferentially of the hollow cylindrical portion, each of the key portions including a first portion outwardly projecting from the outer surface of the hollow cylindrical portion and a second portion inwardly projecting from the inner surface of the hollow cylindrical portion, the rotatable shaft including a larger diameter portion adapted to fit to the inner surface of the hollow cylindrical portion, and a smaller diameter portion adapted to fit to the through hole of the end portion of the hollow cylindrical portion, the larger diameter portion having an end surface to make close contact with the inner surface of the end portion of the hollow cylindrical portion, the larger diameter portion being formed with key ways into which the second portions of the key portions are fit, the impeller being formed with a recess having an inner sidewall with which the outer surface of the hollow cylindrical portion makes close contact, and an inner bottom surface with which the outer surface of the end portion of the hollow cylindrical portion makes close contact, the impeller being formed further with recessed portions into which the first portions of the key portions are fit.

In accordance with the above mentioned structure, the outer and inner surfaces of the hollow cylindrical portion of the bushing axially make close contact with the impeller and the shaft, respectively, and the end portion of the bushing is sandwiched between the impeller and the shaft to thereby axially position the impeller and the shaft. The first portions of the key portions are fit into the recessed portions of the impeller, and the second portions of the key portions are fit into the key ways of the shaft. Thus, a torque is transferred to the impeller from the rotating shaft through the bushing.

Namely, the end portion defined by the outer and inner surfaces which axially position the impeller, the cylindrical portion defined by the outer and inner surfaces and the through hole formed with the end portions all of which are perpendicular to the outer and inner surfaces of the end portion and which ensure concentricity between the impeller and the shaft, and the key portions including the first and second portions which allow axial relative displacement between the impeller and the shaft to thereby ensure torque transfer, are integrally formed as the bushing disposed between the impeller and the shaft. Thus, it is possible to independently control positioning the impeller and the shaft in an axial direction, positioning the impeller and the shaft in a radial direction, and dimension accuracy and rigidity of the portions of the bushing. In addition, the bush integrally formed of the portions provides sufficient rigidity against deformation caused by a centrifugal force. Furthermore, the structure provides good serviceability for assembling the impeller to the shaft through the bushing and disassembling the impeller from the shaft.

In a preferred embodiment, the bushing further includes an annular ring connected to the key portions so that the hollow cylindrical portion and the annular ring are coaxial with each other. The annular ring depresses deformation of the bushing caused by, in particular, a centrifugal force acting on the key portions.

It is preferable that the plurality of key portions are equally spaced away from each other. It is also preferable that the key ways extend from the end surface of the larger diameter portion of the rotatable shaft.

In another aspect, there is provided a bushing for joining an impeller to a rotatable shaft therethrough, including (a) a hollow cylindrical portion including: a sidewall defined by an outer surface and an inner surface coaxial with the outer surface; and an end portion defined by an outer surface perpendicular to an axis of the hollow cylindrical portion and an inner surface parallel to the outer surface, the end portion being centrally formed with a through hole which has a smaller diameter than a diameter of the inner surface of the hollow cylindrical portion and which is coaxial with the inner surface of the hollow cylindrical portion, and (b) a plurality of key portions circumferentially, integrally formed with the hollow cylindrical portion at an opposite side of the end portion, the key portions being defined by a pair of planes parallel to each other and spaced away from each other circumferentially of the hollow cylindrical portion, each of the key portions including a first portion outwardly projecting from the outer surface of the hollow cylindrical portion and a second portion inwardly projecting from the inner surface of the hollow cylindrical portion. The inner surface of the hollow cylindrical portion is adapted to receive therein a larger diameter portion of the rotatable shaft, and the through hole of the end portion of the hollow cylindrical portion is adapted to receive therein a smaller diameter portion of the rotatable shaft. The inner surface of the end portion of the hollow cylindrical portion is adapted to make contact with an end surface of the larger diameter portion. The second portions of the key portions is fit into key ways formed with the larger diameter portion of the rotatable shaft. The outer surface of the hollow cylindrical portion is adapted to make fit contact with an inner sidewall of a recess formed with the impeller, and the outer surface of the end portion of the hollow cylindrical portion is adapted to make close contact with an inner bottom surface of the recess. The first portions of the key portions is adapted to fit into recessed portions formed with the impeller.

In accordance with the above mentioned structure for joining an impeller to a rotatable shaft, there are provided a sufficient ability for transferring a torque between an impeller and a shaft, a self-aligning ability between an impeller and a shaft, and good serviceability for assembling and disassembling, and further provided higher accuracy in axially positioning an impeller and a shaft, readiness in fabrication, and lower fabrication costs.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 3 is an exploded view of the structure illustrated in FIG. 2.

FIG. 4 is a partial perspective view of the structure illustrated in FIG. 2.

DESCRIPTION OF THE PREFERRED EMBODIMENT

Figure 1A:
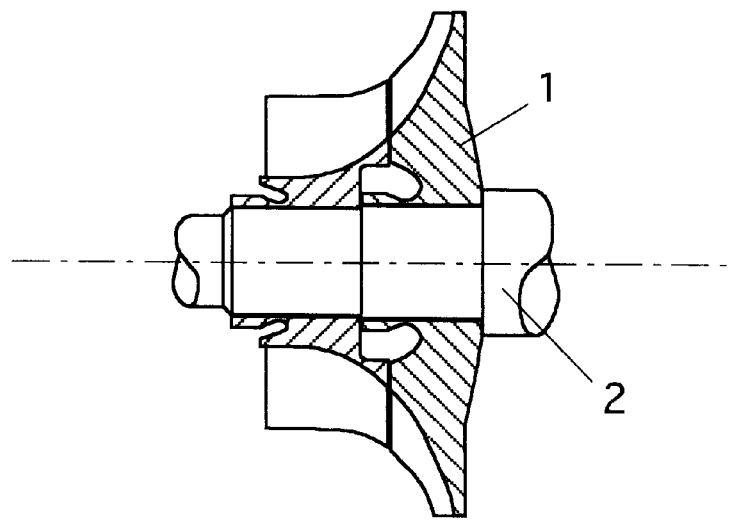
FIG. 1A is a schematic view illustrating a conventional structure for joining an impeller to a rotatable shaft.
Figure 1B:
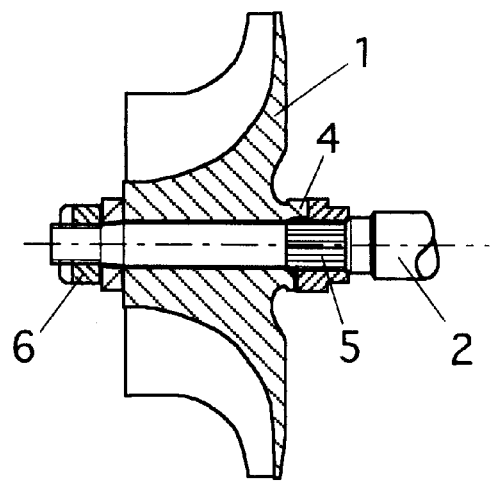
FIG. 1B s a schematic view illustrating another conventional structure for joining an impeller to a rotatable shaft.
Figure 1C:
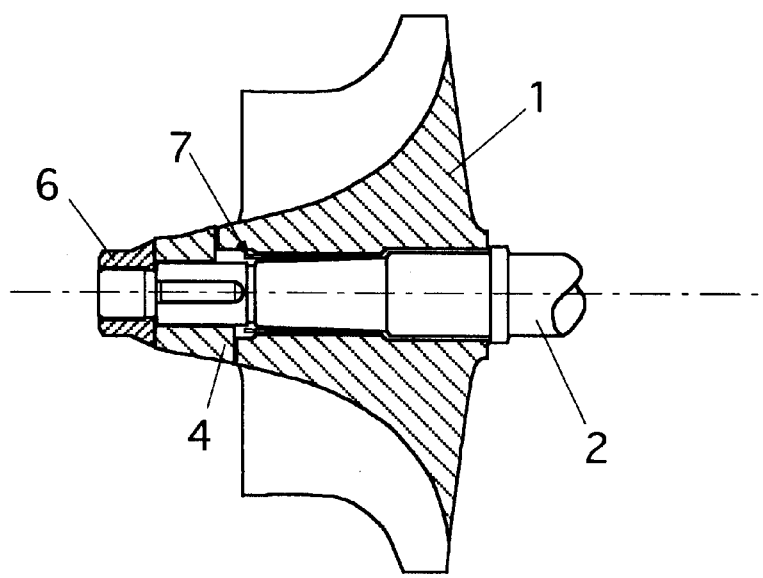
FIG. 1C is a schematic view illustrating still another conventional structure for joining an impeller to a rotatable shaft.
Figure 2:
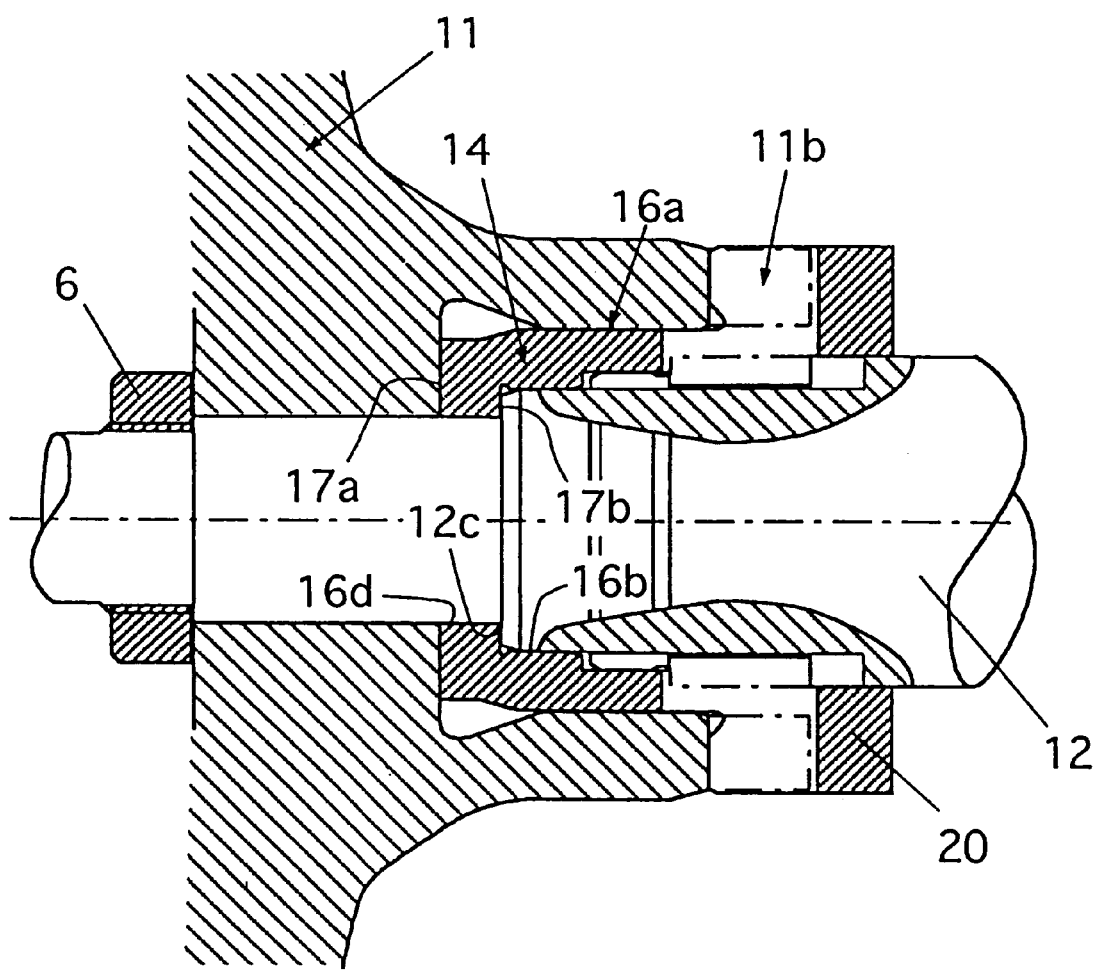
FIG. 2 is a cross-sectional view illustrating a structure for joining an impeller to a rotatable shaft, made in accordance with the preferred embodiment of the present invention.

With reference to FIGS. 2 to 4, the present invention relates to a structure for joining an impeller 11 to a rotatable shaft 12, and includes a bushing 14 sandwiched between the impeller 11 and the shaft 12.

As illustrated in FIGS. 3 and 4, the bushing 14 includes a hollow cylindrical portion 16 and two key portions 18. The hollow cylindrical portion 16 includes a sidewall defined by an outer surface 16a and an inner surface coaxial with the outer surface 16a, and an end portion 16c defined by an outer surface 17a perpendicular to an axis 15 of the hollow cylindrical portion 16 and an inner surface 17b parallel to the outer surface 17a. As illustrated in FIG. 3, the inner surface of the hollow cylindrical portion 16 is comprised of a plurality of segments 16b and 16b'. The segment 16b' has a greater inner diameter than the segment 16b. The end portion 16c is centrally formed with a through hole 16d which has a smaller diameter than a diameter of the segment 16b of the inner surface of the hollow cylindrical portion 16 and which is coaxial with the hollow cylindrical portion 16.

The key portions 18 are formed circumferentially around and integrally with the hollow cylindrical portion 16 at an opposite side of the end portion 16c of the hollow cylindrical portion 16. The key portions 18 are equally spaced away from each other, that is, the key portions 18 in the illustrated embodiment are disposed on opposite ends of a certain diameter of the hollow cylindrical portion 16. The key portions are defined by a pair of planes 19 parallel to each other and spaced away from each other circumferentially of the hollow cylindrical portion 16. Each of the key portions 18 includes a first portion 18a outwardly projecting from the outer surface 16a of the hollow cylindrical portion 16 and a second portion 18b inwardly projecting from the inner surface 16b' of the hollow cylindrical portion 16.

In this embodiment, the inner surface of the hollow cylindrical portion 16 includes the two segments 16b and 16b'. However, it should be noted that the inner surface of the hollow cylindrical portion 16 may be formed as a flat inner surface which, for instance, has the same inner diameter as that of the segment 16b, in which case the second portions 18b of the key portions 18 are designed to project above the flat inner surface.

The rotatable shaft 12 includes a larger diameter portion 12a' designed to fit into the segment 16b' of the inner surface of the hollow cylindrical portion 16, a middle diameter portion 12a designed to fit into the segment 16b, and a smaller diameter portion 12b designed to fit into the through hole 16d of the end portion 16c of the hollow cylindrical portion 16. The middle diameter portion 12a has an end surface 12c which makes close contact with the inner surface 17b of the end portion 16d of the hollow cylindrical portion 16. The larger diameter portion 12a' is formed with key ways 12d into which the second portions 18b of the key portions 18 are fit.

When the inner surface of the hollow cylindrical portion 16 is formed as a single flat inner surface, it is preferable that the key ways 12d extend from the end surface 12c of the middle diameter portion 12a of the rotatable shaft 12.

The impeller 11 is formed with a recess 11a having an inner sidewall with which the outer surface 16a of the hollow cylindrical portion 16 makes close contact, and an inner bottom surface with which the outer surface 17a of the end portion 16c of the hollow cylindrical portion 16 makes close contact, and further with radial key portions or recessed portions 11b into which the first portions 18a of the key portions 18 are fit.

As illustrated in FIG. 2, the shaft 12 is fastened to the impeller 11 by means of a nut 6 with the bushing 14 sandwiched between the impeller 11 and the shaft 12. By fastening the shaft 12 to the impeller 11, the outer surface 16a and the inner surface 16b, 16b' of the hollow cylindrical portion 16 of the bushing 14 axially make close contact with the impeller 11 and the shaft 12, respectively, and the end portion 16c of the bushing 14 is sandwiched between the impeller 11 and the shaft 12 to thereby axially position the impeller 11 and the shaft 12. The first portions 18a of the key portions 18 are fit into the recessed portions 11b of the impeller 11, and the second portions 18b of the key portions 18 are fit into the key ways 12d of the shaft 12. Thus, a torque is transferred to the impeller 11 from the rotating shaft 12 through the bushing 14.

In other words, in the above mentioned structure, the end portion 16c defined by the outer and inner surfaces 17a, 17b which axially position the impeller 11, the cylindrical portion 16 defined by the outer and inner surfaces 16a, 16b, 16b' and the through hole 16d formed with the end portions 16c all of which are perpendicular to the outer and inner surfaces 17a, 17b of the end portion 16c and which ensure concentricity between the impeller 11 and the shaft 12, and the key portions 18 including the first and second portions 18a, 18b which allow axial relative displacement between the impeller 11 and the shaft 12 to thereby ensure torque transfer therebetween, are integrally formed as the bushing 14 disposed between the impeller 11 and the shaft 12. Thus, it is possible to independently control positioning the impeller 11 and the shaft 12 in an axial direction, positioning the impeller 11 and the shaft 12 in a radial direction, and dimension accuracy and rigidity of the portions of the bushing 14.

In addition, since the bushing 14 is integrally formed of various portions, the bushing 14 provides sufficient rigidity against deformation caused by a centrifugal force acting thereon. By fastening the shaft 12 to the impeller 11 by the nut 6 with the shaft 12 being axially pulled, a fastening margin is given to the outer and inner surfaces 17a, 17b of the end portion 16c for axially positioning the impeller 11, and hence an axial shrinkage caused in the inner sidewall of the recess 11a of the impeller 11 by a centrifugal force acting thereon can be absorbed in the fastening margin.

Furthermore, since the structure can be constructed only by fastening the shaft 12 to the impeller 11 through the nut 6 with the bushing 14 interposed therebetween, the structure provides good serviceability for assembling the impeller 11 to the shaft 12 and disassembling the impeller 11 from the shaft 12.

As illustrated in FIG. 3, the sidewall of the hollow cylindrical portion 16 includes a radially thinner portion defined by the outer surface 16a and the segment 16b' of the inner surface. Hence, even if the recess 11a of the impeller 11 is outwardly expanded because of a centrifugal force acting thereon, the radially thinner portion is also outwardly expanded by a centrifugal force, thereby ensuring concentricity in operation between the impeller 11 and the shaft 12.

As illustrated in FIGS. 3 and 4, the bushing 14 further includes an annular ring 20 integrally connected to the key portions 18 so that the hollow cylindrical portion 16 and the annular ring 20 are disposed coaxially with each other. The annular ring 20 provides a high rigidity to the bushing 14, and hence depresses the deformation of the bushing 14 caused by, in particular, a centrifugal force acting on the key portions 18.

Portions to be processed in the integrally formed bushing 14 are the outer and inner surfaces 17a and 17b of the end portion 16c, the outer and inner surfaces 16a, 16b and 16b' of the hollow cylindrical portion 16, and the key portions 18.

Since those portions are formed only of planes perpendicular to each other and rotating planes, it is possible to easily process and fabricate the bushing 14 with high accuracy at low costs.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A structure for joining an impeller to a rotatable shaft, comprising:
    (a) a bushing through which said impeller is joined to said rotatable shaft, said bushing including a hollow cylindrical portion which fits into a recess formed in said impeller and into which said rotatable shaft fits;
    (b) first means for joining said bushing to said impeller so that said bushing is positioned coaxially with said impeller; and
    (c) second means for joining said rotatable shaft to said bushing so that said rotatable shaft is positioned coaxially with said bushing, wherein an inner surface of said hollow cylindrical portion comprises a plurality of segments having different inner diameters, and said rotatable shaft comprises the same plurality of segments as said hollow cylindrical portion, each of said segments of said rotatable shaft having an outer diameter equal to an inner diameter of an associated segment of said inner surface of said hollow cylindrical portion.

2. The structure as set forth in claim 1, wherein said first means includes a projection and a recess into which said projection is fit, one of which is formed with said bushing, and the other is formed with said impeller.

3. The structure as set forth in claim 2, wherein said projection is formed with said bushing and said recess is formed with said impeller.

4. The structure as set forth in claim 3, said first means includes a plurality of said projections formed on an outer surface of said hollow cylindrical portion, said projections being circumferentially equally spaced away from each other.

5. The structure as set forth in claim 1, wherein said second means includes a projection and a recess into which said projection is fit, one of which is formed with said bushing, and the other is formed with said rotatable shaft.

6. The structure as set forth in claim 5, wherein said projection is formed with said bushing and said recess is formed with said rotatable shaft.

7. The structure as set forth in claim 1, wherein said bushing further includes an annular ring connected to said second means so that said bushing and said annular ring are coaxial with each other.

8. A structure for joining an impeller to a rotatable shaft through a bushing which includes a hollow cylindrical portion and a plurality of key portions, said hollow cylindrical portion including: a sidewall defined by an outer surface and an inner surface coaxial with said outer surface; and an end portion defined by an outer surface perpendicular to an axis of said hollow cylindrical portion and an inner surface parallel to said outer surface, said end portion being centrally formed with a through hole which has a smaller diameter than a diameter of said inner surface of said hollow cylindrical portion and which is coaxial with said inner surface of said hollow cylindrical portion, said key portions circumferentially, integrally formed with said hollow cylindrical portion at an opposite side of said end portion of said hollow cylindrical portion, said key portions being defined by a pair of planes parallel to each other and spaced away from each other circumferentially of said hollow cylindrical portion, each of said key portions including a first portion outwardly projecting from said outer surface of said hollow cylindrical portion and a second portion inwardly projecting from said inner surface of said hollow cylindrical portion, said rotatable shaft including: a larger diameter portion adapted to fit to said inner surface of said hollow cylindrical portion; and a smaller diameter portion adapted to fit to said through hole of said end portion of said hollow cylindrical portion, said larger diameter portion having an end surface to make close contact with said inner surface of said end portion of said hollow cylindrical portion, said larger diameter portion being formed with key ways into which said second portions of said key portions are fit, said impeller being formed with a recess having an inner sidewall with which said outer surface of said hollow cylindrical portion makes close contact, and an inner bottom surface with which said outer surface of said end portion of said hollow cylindrical portion makes close contact, said impeller being formed further with recessed portions into which said first portions of said key portions are fit, wherein an inner surface of said hollow cylindrical portion comprises a plurality of segments having different inner diameters, and said rotatable shaft comprises the same plurality of segments as said hollow cylindrical portion, each of said segments of said rotatable shaft having an outer diameter equal to an inner diameter of an associated segment of said inner surface of said hollow cylindrical portion.

9. The structure as set forth in claim 8, wherein said bushing further includes an annular ring connected to said key portions so that said hollow cylindrical portion and said annular ring are coaxial with each other.

10. The structure as set forth in claim 8, wherein said plurality of key portions are equally spaced away from each other.

11. The structure as set forth in claim 8, wherein said key ways extend from said end surface of said larger diameter portion of said rotatable shaft.

12. A bushing for joining an impeller to a rotatable shaft therethrough, comprising:
    (a) a hollow cylindrical portion including: a sidewall defined by an outer surface and an inner surface coaxial with said outer surface; and an end portion defined by an outer surface perpendicular to an axis of said hollow cylindrical portion and an inner surface parallel to said outer surface, said end portion being centrally formed with a through hole which has a smaller diameter than a diameter of said inner surface of said hollow cylindrical portion and which is coaxial with said inner surface of said hollow cylindrical portion; and
    (b) a plurality of key portions circumferentially, integrally formed with said hollow cylindrical portion at an opposite side of said end portion, said key portions being defined by a pair of planes parallel to each other and spaced away from each other circumferentially of said hollow cylindrical portion, each of said key portions including a first portion outwardly projecting from said outer surface of said hollow cylindrical portion and a second portion inwardly projecting from said inner surface of said hollow cylindrical portion, said inner surface of said hollow cylindrical portion being adapted to receive therein a larger diameter portion of said rotatable shaft, and said through hole of said end portion of said hollow cylindrical portion being adapted to receive therein a smaller diameter portion of said rotatable shaft, said inner surface of said end portion of said hollow cylindrical portion being adapted to make contact with an end surface of said larger diameter portion, said second portions of said key portions being fit into key ways formed with said larger diameter portion of said rotatable shaft, said outer surface of said hollow cylindrical portion being adapted to make fit contact with an inner sidewall of a recess formed with said impeller, and said outer surface of said end portion of said hollow cylindrical portion being adapted to make close contact with an inner bottom surface of said recess, said first portions of said key portions being adapted to fit into recessed portions formed with said impeller, wherein an inner surface of said hollow cylindrical portion comprises a plurality of segments having different inner diameters, and said rotatable shaft comprises the same plurality of segments as said hollow cylindrical portion, each of said segments of said rotatable shaft having an outer diameter equal to an inner diameter of an associated segment of said inner surface of said hollow cylindrical portion.

13. The bushing as set forth in claim 12 further including an annular ring connected to said key portions so that said hollow cylindrical portion and said annular ring are coaxial with each other.

14. The bushing as set forth in claim 12, wherein said plurality of key portions are equally spaced away from each other.

15. A structure for joining an impeller to a rotating shaft through a bushing, comprising:

a bushing having first and second ends, a hollow cylindrical portion with a first inner diameter, a through hole at the first end with a diameter smaller than the first inner diameter, and integral key portions at the second end, an impeller having an axial through hole with a diameter substantially equal to the diameter of the through hole of the bushing, a recess adjacent the impeller through hole and dimensioned to receive the hollow cylindrical portion of the bushing, and key ways dimensioned to receive integral key portions of the bushing;

a rotatable shaft comprising a first portion dimensioned to pass through the through holes of the bushing and the impeller, a second portion adjacent the first portion and dimensioned to fit in the hollow cylindrical portion of the bushing, and key ways adjacent the second portion dimensioned to receive integral key portions of the bushing wherein said hollow cylindrical portion of the bushing has an inner surface with a plurality of coaxial segments of increasing diameter, and wherein the second portion of the rotatable shaft has a plurality of surface segments dimensioned to fit the respective inner surface segments of the hollow cylindrical portion.

16. A structure according to claim 15, wherein said bushing further comprises an annular ring, coaxial with said hollow cylindrical portion and adjacent to said integral key portions at the second end of the bushing.

17. A structure according to claim 15, wherein each integral key portion has a first portion for engaging a keyway of the impeller and a second portion for engaging a keyway of the shaft.

* * * * *